(12) United States Patent
Newton et al.

(10) Patent No.: US 8,209,759 B2
(45) Date of Patent: Jun. 26, 2012

(54) SECURITY INCIDENT MANAGER

(75) Inventors: Christopher D. Newton, Douglas (CA);
William Bird, Estey's Bridge (CA)

(73) Assignee: Q1 Labs, Inc., Waltham, MA (US)

( * ) Notice: Subject to any disclaimer, the term of this patent is extended or adjusted under 35 U.S.C. 154(b) by 455 days.

(21) Appl. No.: 11/489,707

(22) Filed: Jul. 18, 2006

(65) Prior Publication Data

US 2007/0180107 A1 Aug. 2, 2007

Related U.S. Application Data

(60) Provisional application No. 60/699,846, filed on Jul. 18, 2005.

(51) Int. Cl.
*G06F 11/00* (2006.01)
*G06F 12/14* (2006.01)
(52) U.S. Cl. .............. 726/25; 726/22; 726/23; 726/24; 726/26; 713/189; 713/181; 713/150
(58) Field of Classification Search .................. None
See application file for complete search history.

(56) References Cited

U.S. PATENT DOCUMENTS

| 7,127,743 | B1 * | 10/2006 | Khanolkar et al. | 726/23 |
|---|---|---|---|---|
| 7,228,564 | B2 * | 6/2007 | Raikar et al. | 726/23 |
| 7,289,988 | B2 * | 10/2007 | Joseph | 1/1 |
| 7,331,062 | B2 * | 2/2008 | Alagna et al. | 726/23 |
| 7,376,969 | B1 | 5/2008 | Njemanze et al. | |
| 7,418,733 | B2 * | 8/2008 | Connary et al. | 726/25 |
| 7,467,400 | B1 * | 12/2008 | Moss et al. | 726/3 |
| 7,509,677 | B2 * | 3/2009 | Saurabh et al. | 726/23 |
| 7,603,458 | B1 * | 10/2009 | Sexton et al. | 709/224 |
| 7,617,073 | B2 * | 11/2009 | Trinon et al. | 702/183 |
| 7,650,638 | B1 * | 1/2010 | Njemanze et al. | 726/23 |
| 7,809,826 | B1 * | 10/2010 | Guruswamy | 709/224 |
| 7,904,456 | B2 * | 3/2011 | Hennan et al. | 707/737 |
| 8,015,604 | B1 * | 9/2011 | Tidwell et al. | 726/22 |
| 8,051,477 | B2 * | 11/2011 | Rockwell et al. | 726/22 |
| 8,074,277 | B2 * | 12/2011 | Freund | 726/23 |
| 8,087,087 | B1 * | 12/2011 | van Oorschot et al. | 726/25 |
| 2002/0078381 | A1 | 6/2002 | Farley et al. | |
| 2004/0044912 | A1 * | 3/2004 | Connary et al. | 713/201 |
| 2006/0294214 | A1 * | 12/2006 | Chou | 709/223 |
| 2007/0299915 | A1 * | 12/2007 | Shraim et al. | 709/206 |
| 2008/0126478 | A1 * | 5/2008 | Ferguson et al. | 709/203 |
| 2009/0126012 | A1 * | 5/2009 | Treadwell et al. | 726/22 |
| 2010/0257185 | A1 * | 10/2010 | Dvir et al. | 707/748 |

\* cited by examiner

*Primary Examiner* — Syed A. Zia
(74) *Attorney, Agent, or Firm* — Goodwin Procter LLP

(57) ABSTRACT

A security incident manger includes events and network flows in the analysis of an attack to better identify the magnitude of the attack and how to handle the situation. The raw events are reported by monitored devices and the incident manager may request network flows from various devices corresponding to a raw event. The manager then assigns a variable score to the severity, the relevance and the credibility of the event to determine its next processing steps. Those events that appear to be a likely and effective attack are classified as offenses. Offenses are stored in order to provide additional data for evaluating future events and for building a "rap sheet" against repeat attackers and repeat events.

17 Claims, 11 Drawing Sheets

SECURITY INCIDENT MANAGER

RELATED APPLICATION

The present Application claims priority to Provisional Patent Application 60/699,846 filed Jul. 18, 2005 the contents of which are incorporated herein, by reference, in their entirety.

BACKGROUND

1. Field

The present disclosure relates generally to computer software and more particularly to network security.

2. Reference to an Appendix

The present disclosure includes an Appendix of pseudo source code related to tests of events and 3. Background Security Event Managers (SEMs) focus primarily on the tools, technologies and services that are needed by IT security operations to manage security devices and the security of IT infrastructure, applications and transactions. The value proposition for such technology is the correlation of security data from multiple devices and systems to enable better security assessment and support appropriate remedial action. The motivation behind this technology grew out of the failure of intrusion detection systems (IDSs) to separate real threats from the background noise of ineffective probes, false alarms and normal system changes.

At one time IT security staff responsible for security operations faced a significant challenge when it came to protecting the security infrastructure of an organization. Faced with excess instrumentation for networks, servers and security devices that produced a flood of data and false alarms, security personnel had to sort through the data to determine if a security event was taking place, substantiate the criticality of the event and finally initiate an appropriate response.

It was in this environment that IT security management market emerged to meet the need to improve the efficiency of intrusion detection systems, consolidate information about enterprises' general security postures and support enterprises' efforts to consolidate security operations. In addition, companies are turning to centralized security event management tools to help them make sense of crucial security information.

There remains a need in this area for improved incident management systems and methods that identify useful information while discarding unwanted or unneeded data.

SUMMARY

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

Figure 1:
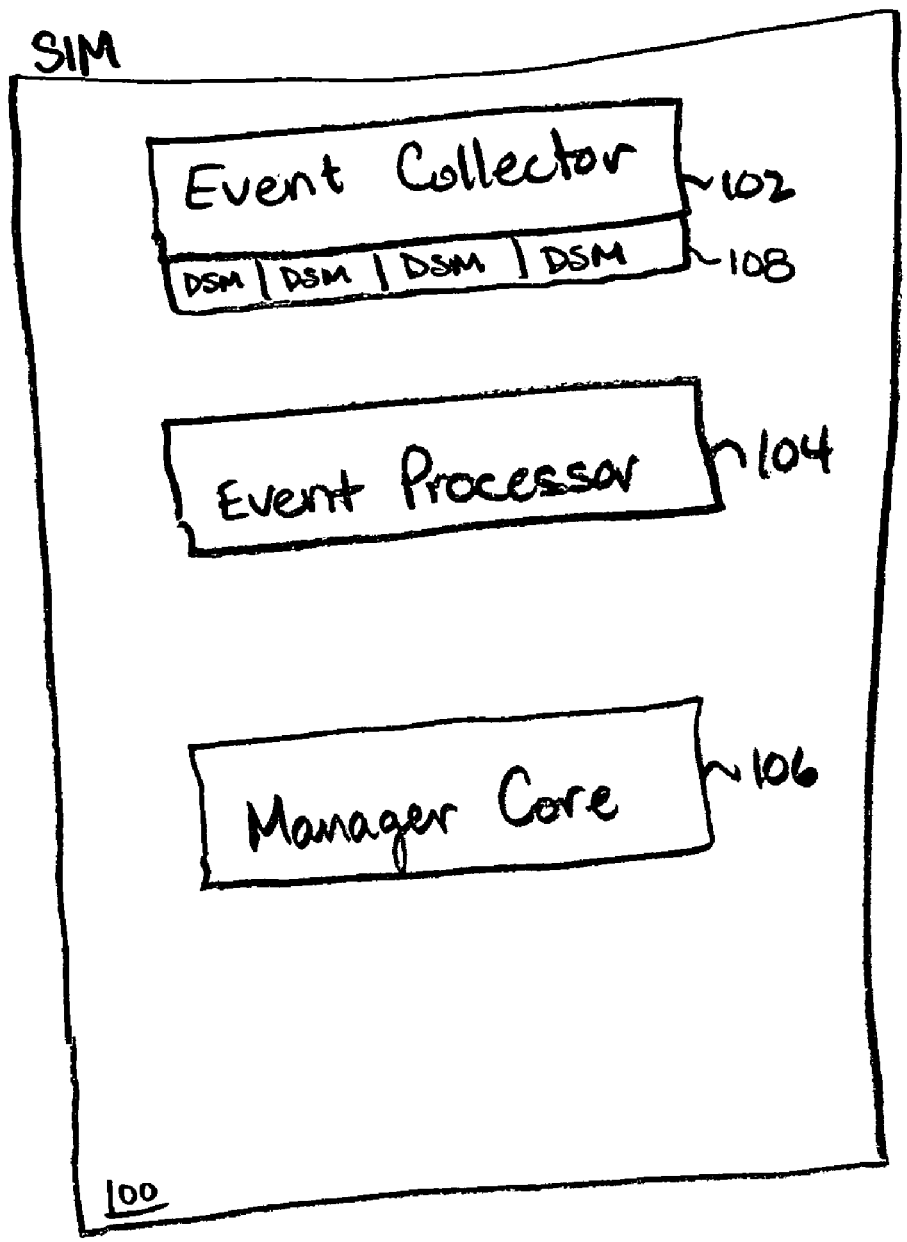
FIG. 1 illustrates a functional block diagram of an exemplary security incident manager.
Figure 2:
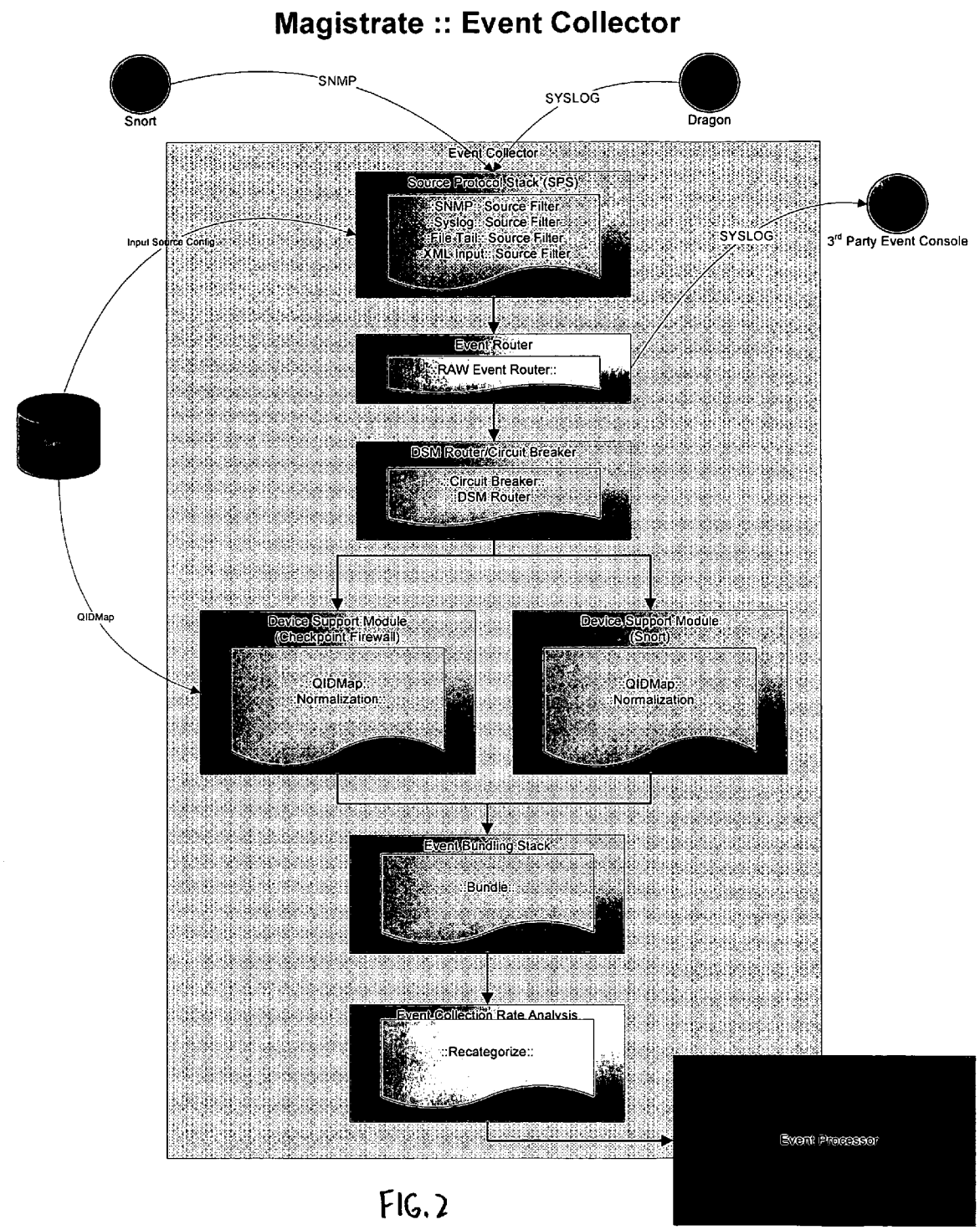
FIG. 2 illustrates more detail of the event collector of FIG. 1.
Figure 3:
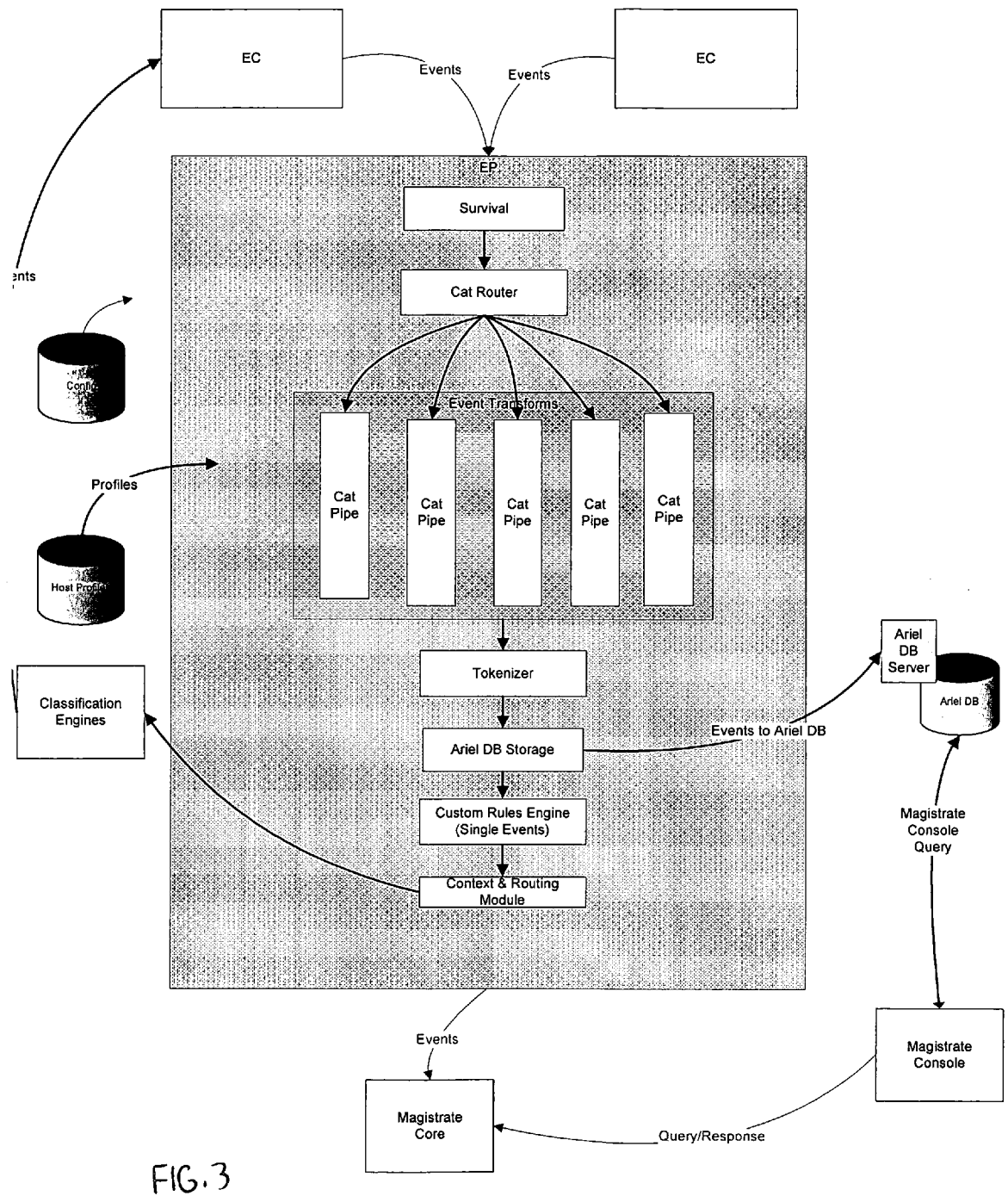
FIG. 3 illustrates more detail of the vent processor of FIG. 1.
Figure 4:
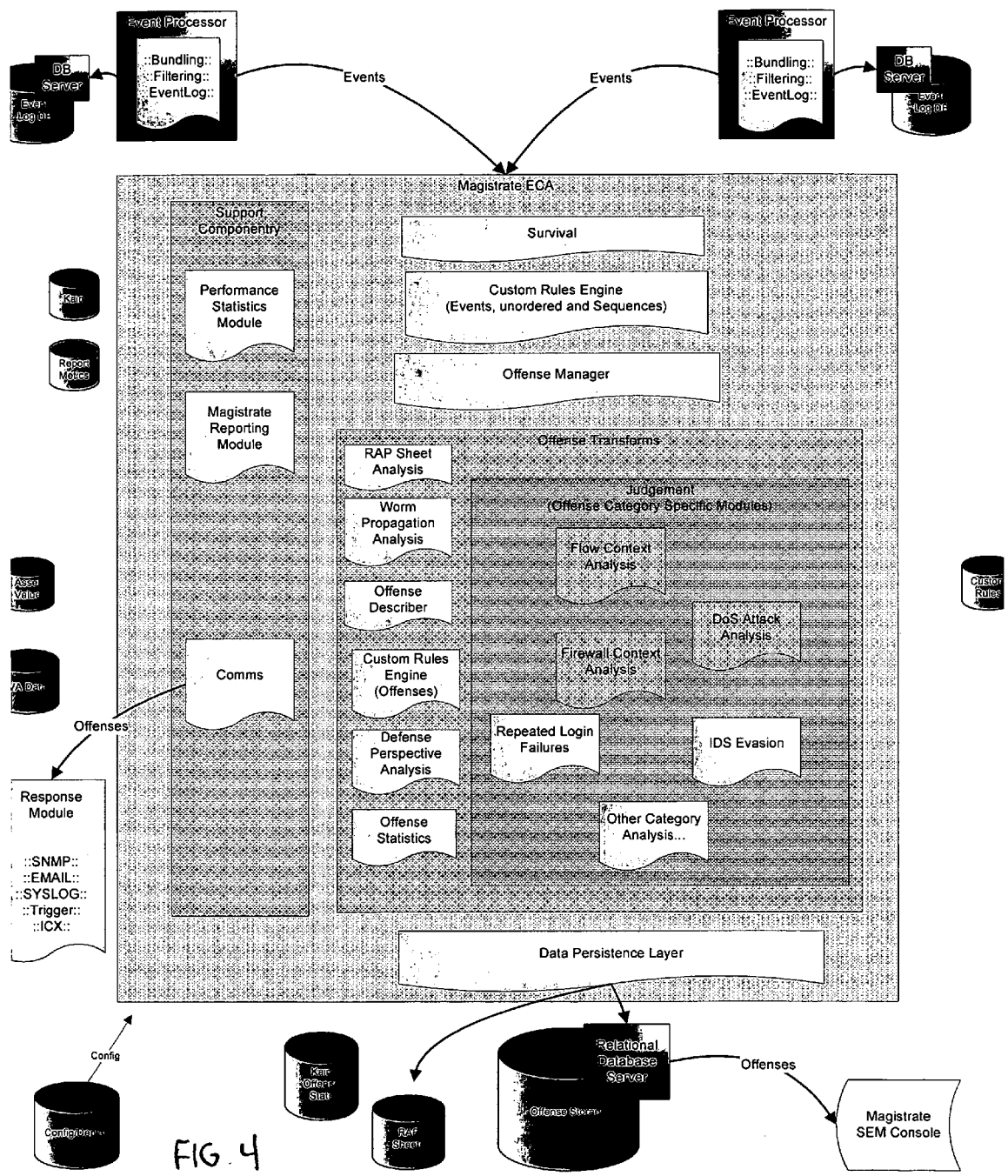
FIG. 4 illustrates more detail about the manager core of FIG. 1.
Figure 5:
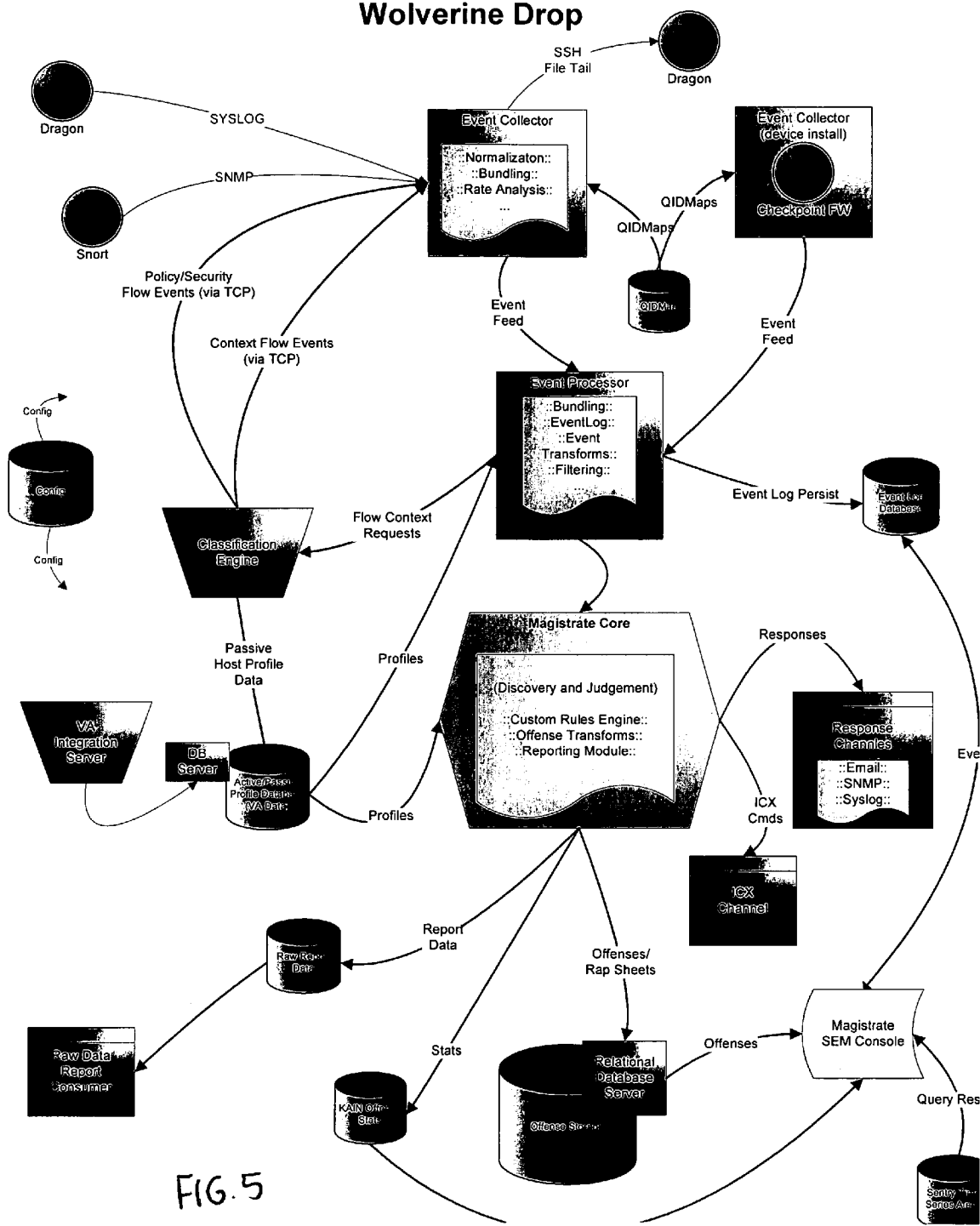
FIG. 5 illustrates a functional block diagram of additional components of an exemplary security incident manager.
Figure 6:
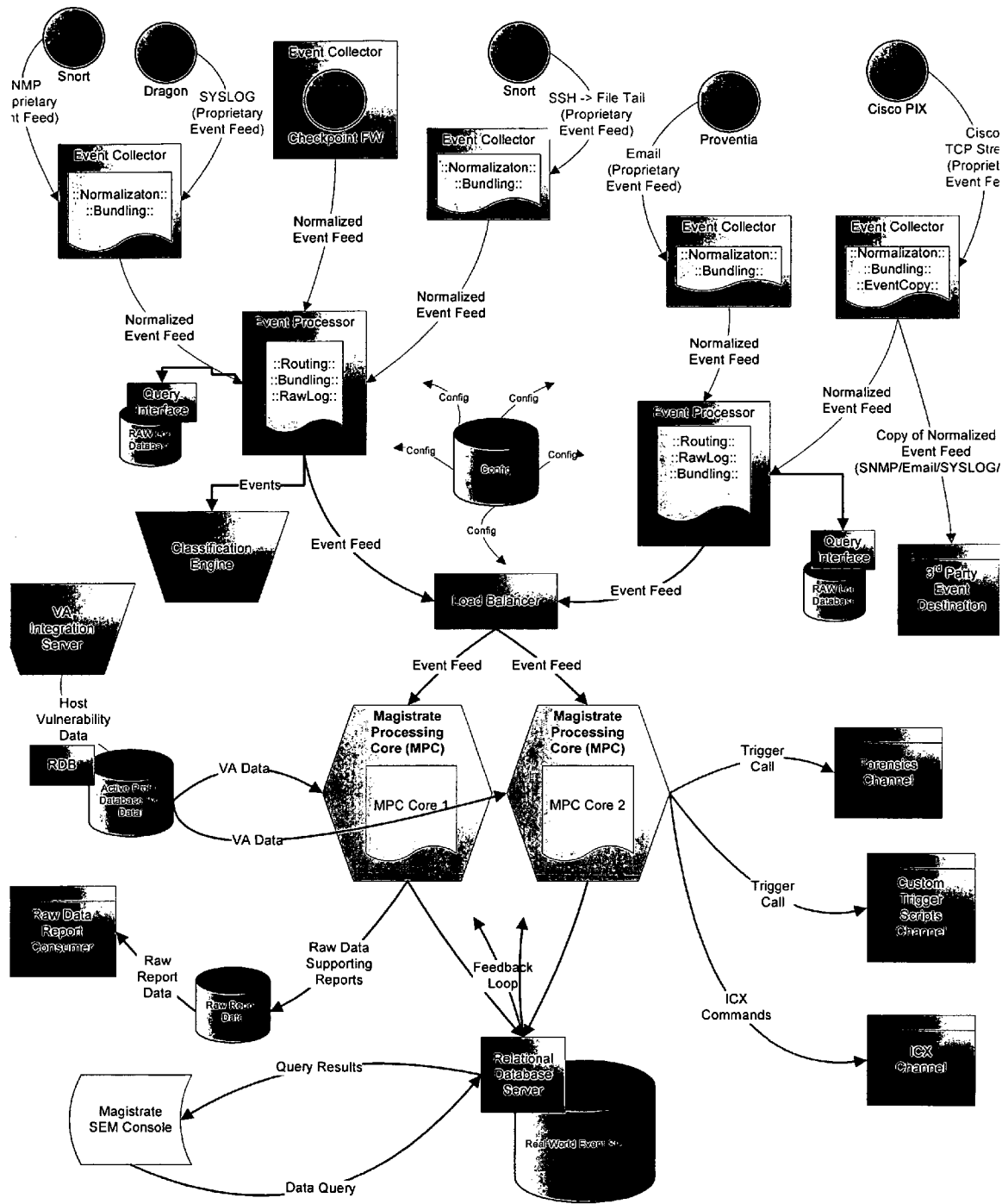
FIG. 6 illustrates another exemplary environment in which a security incident manager operates.
Figure 7:
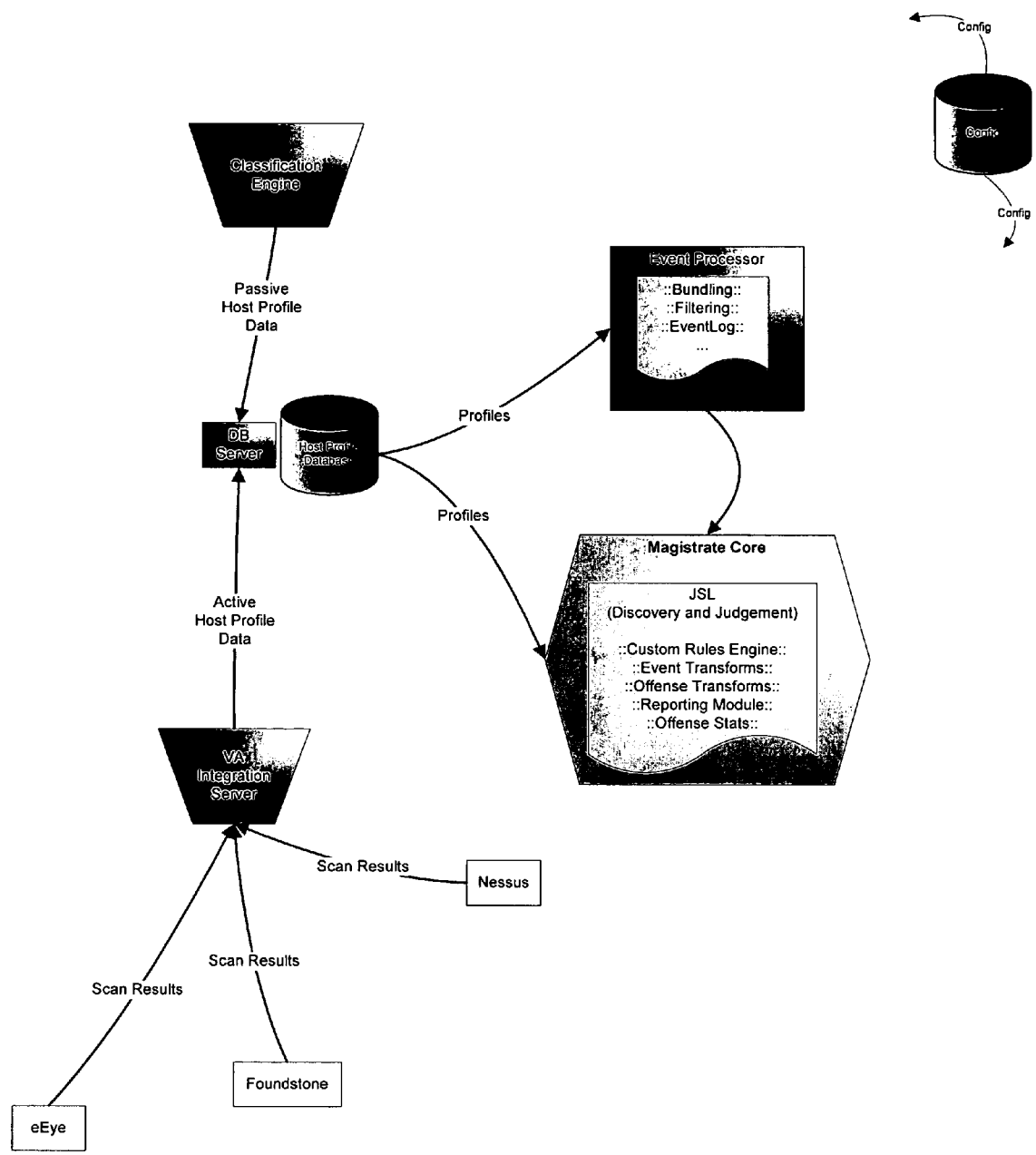
FIG. 7 illustrates a portion of the system relating to building profiles of network hosts in accordance with the principles of the present invention.
Figure 8:
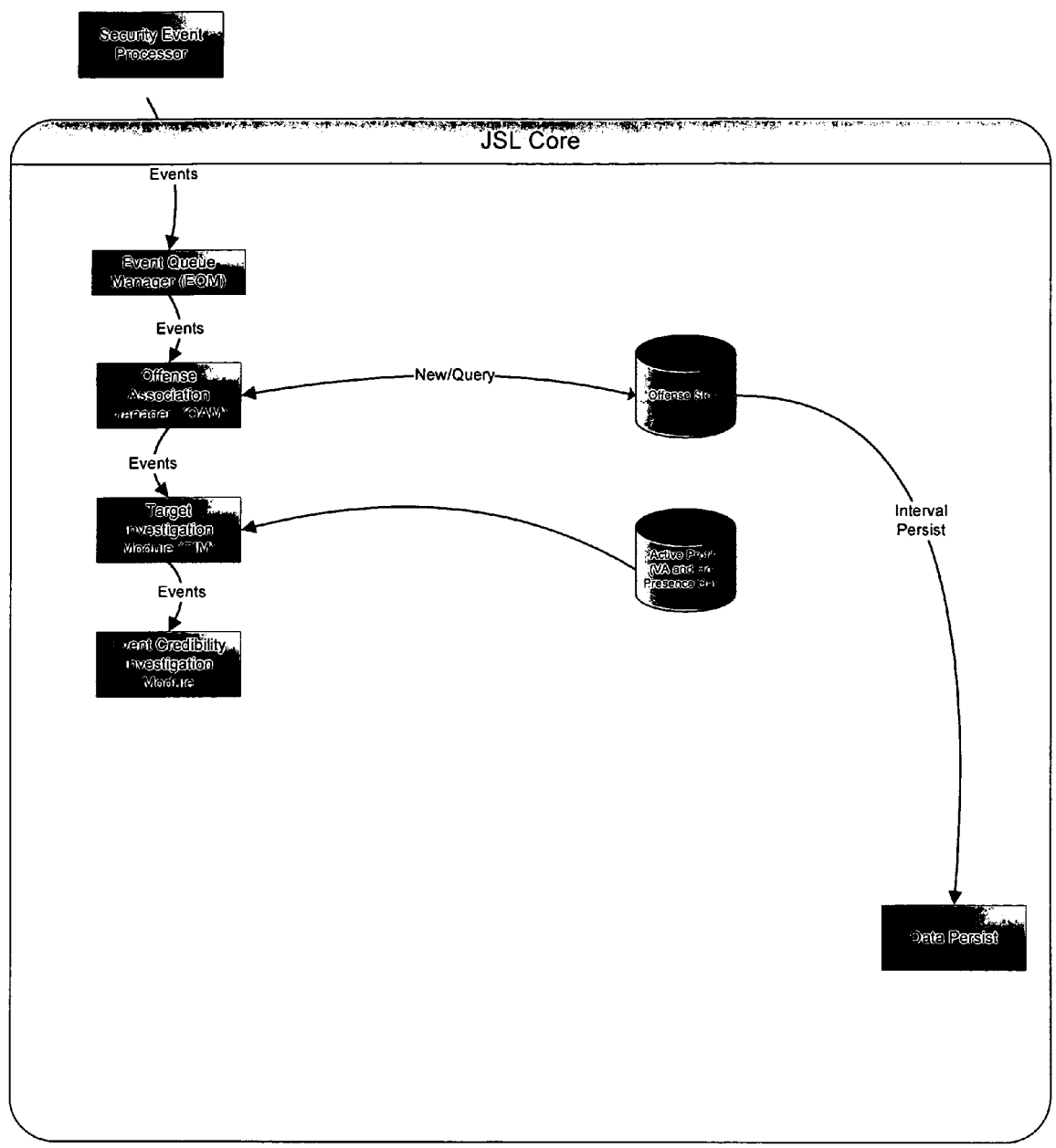
FIG. 8 illustrates an exemplary portion of the manager core related to judging offenses and events.
Figure 9:
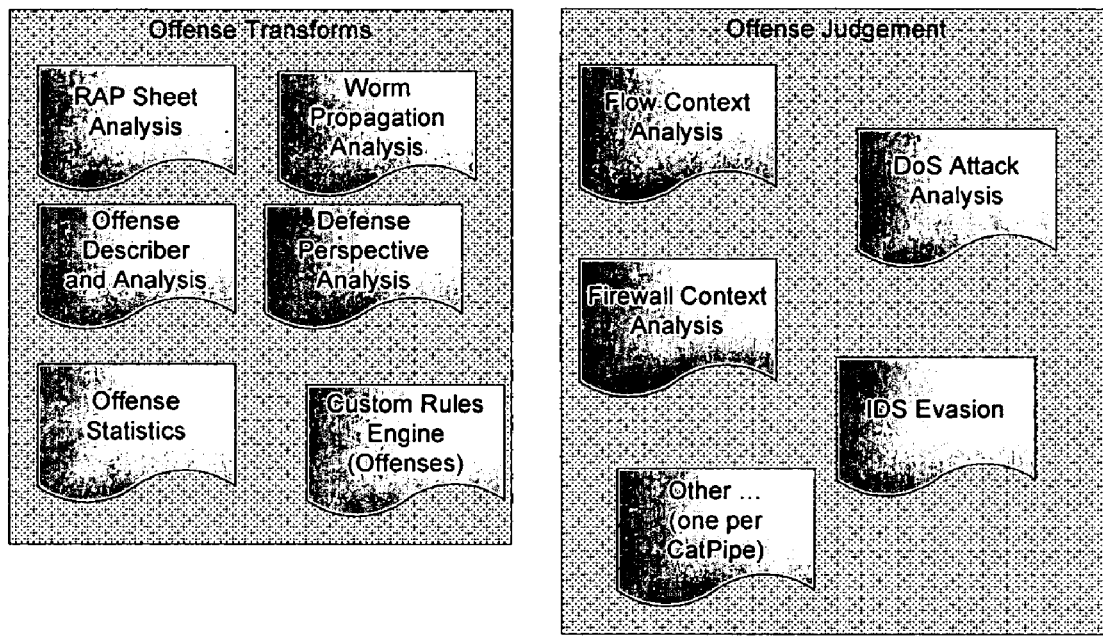
FIG. 9 illustrates portions of the core manager relating to handling offenses in accordance with the principles of the present invention.
Figure 10:
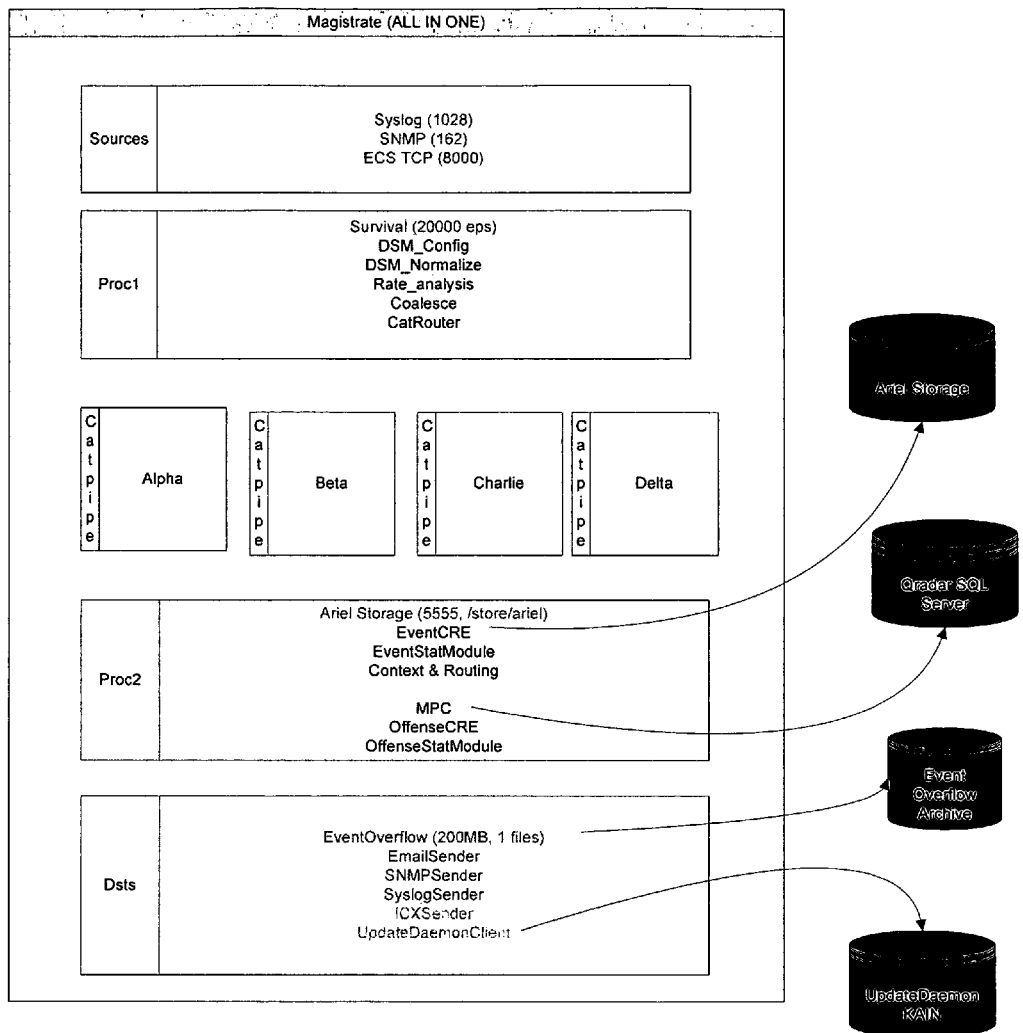
FIG. 10 illustrates another view of an exemplary security incident manager in accordance with the principles of the present invention.
Figure 11:
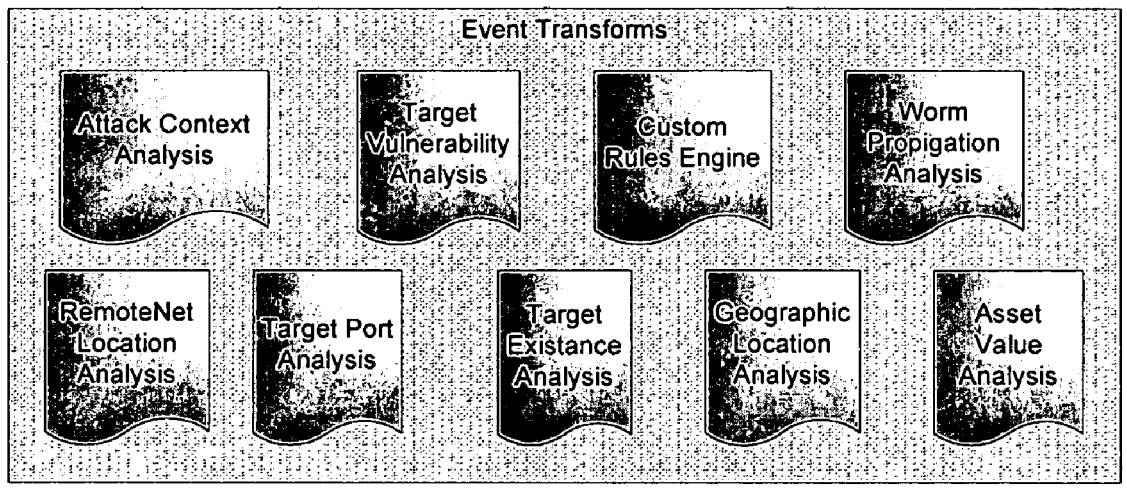
FIG. 11 illustrates exemplary transforms that may be applied to one or more vents in accordance with the principles of the present invention.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Glossary

EC Event Collector. A software component acting as a container for Device Support Modules. Main purpose is to consume security events from DSMs, normalize the events and pass them to Security Event Processors.

EP Event Processor. A software component acting as a work processor, with primary functions composed of routing, copying, bundling, and event logging and query.

SIM Security Incident Manager. The category of security software that Magistrate falls into.

VA Vulnerability Assessment. The act of scanning a network host for vulnerabilities.

VAIS Vulnerability Assessment Integration Server. A software component acting as a controlling agent and generic interface to $3^{rd}$ party VA scan servers.

DPs Defense Perspectives. Each totally unique device type is considered a defense perspective. 5 Snort boxes, and 3 Cisco IDS boxes would be considered 2 Defense Perspectives.

MQ Message Queue.

Magistrate Magistrate is the name given to the core processing component that implements that Judicial System Logic (JSL), and to the product as a whole.

JSL Judicial System Logic. The foundation for event processing and correlation in Magistrate.

JSTL Judicial System Tests Library. The library of tests available for use in the JSL, and in the CRE.

CRE Custom Rules Engine. The custom rules that Magistrate will load that are looking for, or the absence of, sequences of events. Magistrate will ship with some custom rules, and customers will be able to create new custom rules for their environment.

QIDMap Term used to refer to the extensible table of proprietary device event IDs to the unique Q1 Labs Event Identifier (QID). Each DSM will need a populated QIDMap. In addition, the QIDMap included with each DSM will include the category/severity and credibility mappings for the device events.

Source Protocol SNMP, File Tail, TCP Socket, and Syslog are all examples of Source Protocols. They represent the protocol layer over which devices send events. Some Source Protocols are proprietary.

Filter A component inside the ECS that performs one function on a stream of events. Filters have inputs, a core function to perform, and destinations.

Filter Stack A group of filters wired together to form a structure of logic. Filter stacks have input sources, one or more filters performing some core function and destinations.

ECS Event Correlation Server. The java-based event handling bus and correlation engine.

ECA Event Correlation Application. A group of filter stacks wired together to form a structure of logic complex enough to be considered an application. ECAs have sources, a core application logic, and destinations. The source and destination of an ECA can be other ECAs.

Component Config A named configuration specific to a particular named component in a particular deployment. For instance, the Security Event Collector (SEC) named 'Bob', has a Component Configuration called Bob that defines the configuration details of this specific deployment (max threads, cache to use, tuning parameters . . . ). Part of the component's configuration is which application configuration it should load.

Application Config A named configuration specific to a particular instance of an application type. For instance, an application example would be 'Event Processor'. Magistrate components provide the applications. For instance, the 'SEP', provides the 'Event Processor' application. The application configuration defines how this particular instance of a SEP will do the event processing job.

FIG. 1 depicts a block level diagram of a computer-based security incident manager (SIM) in accordance with the principles of the present invention. As known to one of ordinary skill, this system can be implemented as one or more functional software modules that interoperate to provide the capabilities described herein. The underlying hardware and software platform may include one or more processors and may even be a distributed system comprising a plurality of heterogeneous non-local machines.

The SIM 100 includes three primary functional pieces: the event collector 102, the event processor 104, and the manager core 106. The event collector 102 has a fundamental responsibility to collect events from different types of security devices, transform the event into a well-known (or agreed upon) format and pass it off to the event processor 104 for further processing. The event processor 104 is responsible for consolidating many event streams from event collectors and passing them on to the manager core 106. When possible, the event processor 104 will perform additional bundling and preprocessing to make the job of the manager core 106 less extensive. The manager core 106 receives events from the event processor 104 and determines their disposition and possibly classifying one or more events as an offense.

The manager core 106 includes at least the following functionality. It recognizes when an event processor is flooding it with information and can institute survival procedures to divert or ignore the flood of data. The manager core 106 calculates severity, relevance, and credibility variables for each offense and for each category of attack in the offense. The manager core 106 includes a custom rules engine that can detect the presence of user specified events during a particular time period. These specified events may be an ordered set of event or unordered. The custom rules engine may also detect the presence of a user specified offense. The manager core 106 collects and generates a variety of statistics related to each offense, each events, each target and source of an event, each network flow and firewall event.

The manager core 106 also includes an offense describer module that names the offense after considering all the attributes of the offense (e.g., all the attack categories). The core manager 106 also includes modules that adjust the credibility, relevance and severity of an offense based on such information as whether multiple products are involved in the attack, whether the source has a "rap sheet" of previous offenses, whether certain thresholds of the system have been exceeded. Ultimately, the manager core communicates with other system components through e-mail, SNMP, ICX block requests, etc. to remediate an offense.

Returning to the event collector 102, it normalizes all events collected from devices. In one particular embodiment, it and also sets fields in the normalized event based on parameters in a global map (referred to as the QIDMap). It can also coalesce events that are related to one another to reduce the number of discrete events sent to the event processor 104. Although one event collector 102 is depicted in FIG. 1, an event collector may be present for every monitored elements of an enterprise network.

Monitored elements are security point products such as intrusion detection systems (network-based or host-based), firewalls, anti-virus software packages, VPN, routers, web servers, databases, and host operating systems. The products generate security events that can be collected by the event collector 102 and forwarded to the event manager 104. A security event is usually a single or collection of actions that violate the security policy of an organization. For example, an intrusion detection system reports a network attack and firewalls report rule-set violations which are consolidated and eventually sent to the manager core 106 for processing.

In general, three different event collectors are contemplated: an event collector installed on the monitored element, an event collector that polls a monitored element to gather events, and an event collector that receives events sent from the monitored elements.

The event processor 104 performs additional coalescing of events based on the host profile data (e.g., users.conf and net.conf settings). The event processor supports requesting network flow context events from classification engines and requests for firewall context events. In a particular embodiment, the specific security events which the event processor requests is determined by the events QIDMap entry.

The event collector 102 may utilize different device support modules (DSMs). A DSM, in general, supports parsing and interpretation of a device specific protocol for reporting events. A device may, for example, use both syslog and SNMP to report an event and a DSM may support one or both of these methods. In normalizing the event, the DSM identifies all relevant fields for the event. This can be accomplished using the QIDMap table which has a unique entry for each of the different events available from each of the different monitored elements. In practice, the reporting device reports the event to the DSM according to the device's protocol and the DSM identifies the unique event identifier from the QIDMap table.

Some fundamental differences between the present system and other incident management systems are described below:

The vent collectors work on information from another device rather than analyzing individual network flow packets. The event processor streamlines handling event flows by processing the event depending on its type as determined from a table lookup or similar method. The processor can raise or lower three variable relating to an event (credibility, severity, relevance). The manager core processes event flows to determine which rise to the level of being an offense. These offenses can be annotated with the plain-English description to facilitate remediation and reporting. Credibility relates to the source of the event and different devices may have different levels of credibility depending on past behavior or known faults or strengths of that device. Severity measure how much of a threat is the attack to my enterprise. The target, the category of attack, the vulnerability of the targets and the number of targets are all some attributes that help measure severity. Relevance relates to how relevant the offense or violation is to you and your business rules. Overall, the credibility, severity, threat level, relevance, attacker ID, target, offense category, etc. are all used to generate a magnitude score to describe the security incident.

Particular benefits are provided by storing collected events in such a way that they may be indexed along multiple dimensions so that retrieval and organization of events are robust and simplified. Such events may have rules applied to them as the events are being collected and as the offenses are being built so that at an early stage it can be determined whether or not to collect related network flows that might help analyze and identify an event. Thus, raw events and packet flows may be integrated into one set of data that can be evaluated as an "event". In addition to the events being categorized, the offenses may be organized into different categories to simplify handling, processing, reporting, and mediating the offenses.

Along with the inclusion of packet flows, passive and active scan data of the devices and hosts on the network may be utilized to provide additional data about vulnerabilities and the potential results of attacks. These scans can include information about executing applications, open ports, etc.

Example of Security Incident Manager Differences from Simple Intrusion Detector:

One recent Internet word spread by first determining the local machine's IP address. It did this by looping through every address returned by gethostbyname for the local hostname. If it found a publicly routable Internet address (non-RFC1918) it would use that address. If none were found it would use any private subnet address (RFC1918 or 127.0.0.1) it found. If no address was returned it would use 127.0.0.1

If successful, the exploit would open a shell on the remote system on TCP port 9996 and attempt to copy the worm via an FTP transfer. A SIM system as described herein would have detected the following:

Scanning of IP address would have been a violation of most corporate Firewalls and hence would have raised in an alert in the SIM core.

FTP connects to remote hosts outside the corporate network would also be deemed as a violation of security policy and recorded as a security event by the SIM core.

Activity on port 9996 could have also triggered a security incident based on the SIM rule set.

These three events by themselves may have not been interpreted as a malicious attack. But once correlated the SIM would have alerted the system admin of a possible attack. It would have observed that the host scanning for IP addresses was also the host attempting FTP connects and all on the same port 9996.

Thus an organization with a SIM deployed would have detected this worm at a faster pace and stopped the spread of the virus by configuring the Antivirus gateways at the internet router to remediate the attack.

SUMMARY

The SIM system described herein addresses fundamental knowledge-gaps in existing security management solutions and simplifies how these solutions are delivered to customers. It unifies network behavior analysis, security event correlation and vulnerability management into one system.

As described, some benefits of the presetn system include:

Asset profiles—incorporating asset vulnerability data—tie incidents and threats to business impact.

Multiple disparate products do not have to be deployed and operated. All supporting information or evidence from an incident is captured and correlated in one product.

Network anomaly detection isolates unknown attacks and insider threats that are easy to overlook.

The unified solution addresses both security and network compliance and policy issues, reducing the costs of compliance and policy enforcement.

Network application recognition automatically detects new business services without the need for host agents.

The present system provides network and security managers with unmatched knowledge of activity by collecting data from several key sources to provide a comprehensive, real-time representation of network and security characteristics across the enterprise:

Security Event Data—it collects event data when security products—such as firewalls, IDS and IPS, servers, identity and access management systems, routers, switches, operating systems or VPN devices—indicate that a threat is emerging.

Network Flows—it sees all activity across a network by incorporating flow data, including all conversations, sessions and activity. This combined data includes application-level information to provide the highest level of network activity awareness.

Vulnerability Data—it leverages vulnerability data, including the top threatening subnets worldwide, blacknet IPs and spyware sites. This information provides powerful capabilities for detecting known threats.

The system includes Asset Profiles through a unique combination of active and passive vulnerability scanning. Thus, it passively monitors network activity and builds real-time profiles of all network assets. It augments asset profiles with asset vulnerability and activity data to automatically measure risk exposure. Rather than report on cryptic security events, it identifies business assets that are at risk of attack as well as those that are under attack. Within those asset profiles it keeps all security events and network behaviors that contribute to an attack.

Also described above is the Judicial System Logic which is centralized intelligence and analysis of surveillance data. Enterprise-wide surveillance data is fed to the Judicial System Logic (JSL), a relational security engine that brings together events, vulnerabilities and traffic flows to locate and isolate a threat. The JSL uses the criminal justice model for finding and dealing with offenders. It judges the magnitude of a potential problem by analyzing the collected data for severity, credibility and relevance. Armed with this information, the JSL establishes the threat's vector and forecasts the likelihood of its success against a network asset.

The system also includes support for data capture and storage to understand the full impact of attacks. It stores raw security events with a historical record of all flows and network conversations it has observed, including a portion of content for every flow for future forensics and compliance reporting. If a compromised server instigates further attacks, the system links these attacks and follows the full chain of infection. Analysis and search tools provide a detailed understanding of the attack so users can gauge its impact, identify the attacker and plan preventive measures for the future.

Also provided is remediation to permit real-time control of network and security issues. The system allows problems to be resolved with either an automated or "one click" response, fixing any type of network misuse, internal or external, intentional or accidental. Then the system leverages the most appropriate security device or network infrastructure component to resolve business offenses anywhere in the enterprise quickly and efficiently. Customers choose among different levels of threat mitigation—from hands-on control to full automation—to resolve critical dangers that hide in daily network activity. The multiple remediation options include session reset, switch block, quarantine and IPS/FW block.

Full-featured reporting capability is provided as well that assists with compiling security and compliance intelligence. This capability provides organizations with multiple options for publication and delivery of security and compliance reports that are operationally accurate and business-relevant. It provides reports that span the enterprise or focus on one department. These standard and customizable reports provide unique charts for both executive and operational use. Users can choose between a variety of baselines, trends and delta displays, as well as user-configurable reports. Also provided are Web-based or email delivery options for increased flexibility.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A computer-implemented method of managing security incidents in a network, the method comprising:
   receiving from at least one monitored security device at least one raw event related to a network attack on a target, the event received by one of a plurality of pluggable device support modules each configured to monitor packet flows on a reporting protocol of a monitored security device;
   normalizing the raw events, by the pluggable device support module, into a normalized event structure based on the monitored security device that generated the raw event, including assigning a mapped value for each of a severity and credibility based on the monitored security device that generated the raw event;
   adjusting each of the severity and credibility according to a set of rules,
      wherein the adjusted severity is a weighted sum based on the threat the attack poses to a target device, and
      wherein the adjusted credibility is a weighted sum based on vulnerabilities of the target and capability of the attacker to harm the target;
   collecting network flows related to the network attack on the target that are related to the received at least one raw event;
   identifying an offense based on the assigned and adjusted severity, relevance, and credibility of the normalized event and on the collected network flows;
   forwarding the identified offense for remediation.

2. The method of claim 1, wherein the raw event is received by the pluggable device support modules via one of a syslog channel or SNMP.

3. The method of claim 1, further comprising receiving a plurality of raw events and collating two or more of the raw events into an event flow.

4. The method of claim 1, further comprising indexing the normalized raw event according to multiple categories.

5. The method of claim 1, wherein the vulnerabilities of the target are determined based on an active scan of the target.

6. The method of claim 1, wherein the vulnerabilities of the target are determined based on a passive scan of the target.

7. The method of claim 1, further comprising:
   creating a target profile based on an active scan of the target and a passive scan of the target; and
   adjusting the severity, relevance and credibility of the raw event based on the profile of the target.

8. The method of claim 1, wherein the monitored security device is one of a intrusion detection system, firewall, anti-virus software, virtual-private network, router, web server, database, and host operating system.

9. The method of claim 1, further comprising receiving one or more user specified policies and detecting a raw event that violates the one or more user specified policies.

10. The method of claim 1, further comprising adjusting the severity, relevance and credibility based on third party vulnerability data on the target.

11. The method of claim 1, further comprising indexing the raw event with historical flow record related to the raw event.

12. The method of claim 1, further comprising:
   detecting a flood of raw events;
   identifying the event stream that is the source of the raw events; and
   buffering the flood of events for later processing.

13. The method of claim 12, further comprising
   detecting an end to the flood of raw events; and
   forwarding the buffered events for normalization.

14. The method of claim 12, wherein identifying the event stream comprises identifying the pluggable device support module receiving the flood of raw events, and throttling the identified pluggable device support module.

15. The method of claim 1, wherein the normalized event structure includes fields for an event ID, monitored security device ID, a source IP address, a source port, a destination IP address, a supported protocol, an event classification ID, a credibility of the event, the severity of the event, the relevance of the event.

16. The method of claim 1, wherein identifying the offense comprises calculating a severity, relevance and credibility for each offense based on the severity, relevance and credibility of the categories of the offense, and calculating the severity relevance and credibility for each category of attack contained in the offense.

17. A network security incident management system, the system comprising:
- an event collector module executing on a computer and performing the operations of:
  - receiving from at least one monitored security device at least one raw event related to a network attack on a target, the event received by one of a plurality of pluggable device support modules each configured to monitor packet flows on a reporting protocol of a monitored security device, and
  - normalizing the raw events, by the pluggable device support modules, including assigning a mapped value for each of a severity and credibility based on the monitored security device that generated the raw event;
- an event processor module executing on a computer that receives the normalized events from the event collector, bundles related events, collects network flows related to the network attack on the target that are related to the received at least one raw event, and adjusts each of the severity and credibility according to a set of rules,
  - wherein the adjusted severity is a weighted sum based on the threat the attack poses to a target device, and
  - wherein the adjusted credibility is a weighted sum based on vulnerabilities of the target and capability of the attacker to harm the target;
- an event data computer server that receives and stores normalized events, bundled events, and network flows from the event processor module; and
- a magistrate processing core module executing on a computer and performing the operations of:
  - receiving normalized events, bundled events, and collected network flow data;
  - identifying an offense based on the assigned and adjusted severity, relevance, and credibility of the normalized event and on the collected network flows;
  - forwarding the identified offense for remediation.

* * * * *